United States Patent
Hiranaka et al.

(10) Patent No.: US 12,429,873 B2
(45) Date of Patent: Sep. 30, 2025

(54) HAUL VEHICLE MANAGEMENT SYSTEM AND HAUL VEHICLE MANAGEMENT METHOD

(71) Applicant: Komatsu Ltd., Tokyo (JP)

(72) Inventors: Takashi Hiranaka, Tokyo (JP); Atsushi Sakai, Tokyo (JP); Yuji Kobashi, Tokyo (JP); Kenta Osagawa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 273 days.

(21) Appl. No.: 17/922,047

(22) PCT Filed: May 10, 2021

(86) PCT No.: PCT/JP2021/017761
§ 371 (c)(1),
(2) Date: Oct. 28, 2022

(87) PCT Pub. No.: WO2021/246112
PCT Pub. Date: Dec. 9, 2021

(65) Prior Publication Data
US 2023/0266761 A1 Aug. 24, 2023

(30) Foreign Application Priority Data
Jun. 1, 2020 (JP) ................. 2020-095246

(51) Int. Cl.
*G05D 1/00* (2024.01)
(52) U.S. Cl.
CPC ................. *G05D 1/0212* (2013.01)

(58) Field of Classification Search
None
See application file for complete search history.

(56) References Cited

U.S. PATENT DOCUMENTS

| | | |
|---|---|---|
| 6,064,926 A | 5/2000 | Sarangapani et al. |
| 2017/0177002 A1 | 6/2017 | Ogura et al. |
| 2017/0367252 A1 | 12/2017 | Sakaguchi et al. |
| 2019/0339701 A1* | 11/2019 | Pedersen .............. G05D 1/0044 |
| 2020/0026305 A1 | 1/2020 | Maekawa et al. |

(Continued)

FOREIGN PATENT DOCUMENTS

| | | |
|---|---|---|
| JP | H11242520 A | 9/1999 |
| JP | 2017-228155 A | 12/2017 |

(Continued)

OTHER PUBLICATIONS

Office Action mailed Feb. 25, 2025, issued in the corresponding Japanese patent application No. 2020-095246 and an English machine translation thereof.

*Primary Examiner* — Christian Chace
*Assistant Examiner* — Shayne M. Gilbertson
(74) *Attorney, Agent, or Firm* — Troutman Pepper Locke LLP

(57) ABSTRACT

A haul vehicle management system includes: a three-dimensional data acquisition unit that acquires three-dimensional data outside an outline of a traveling area where a haul vehicle can travel; and a course data generation unit that generates a traveling course of the haul vehicle on the basis of outer shape data of the haul vehicle and the three-dimensional data, the traveling course being set in the traveling area.

14 Claims, 11 Drawing Sheets

(56) References Cited

U.S. PATENT DOCUMENTS

2020/0047667 A1\* 2/2020 Ji .......................... B60Q 9/008
2022/0095525 A1\* 3/2022 Amann ................ G05D 1/0278

FOREIGN PATENT DOCUMENTS

| JP | 2019-036073 A | 3/2019 |
| JP | 2019-96342 A | 6/2019 |
| JP | 2019-169059 A | 10/2019 |

\* cited by examiner

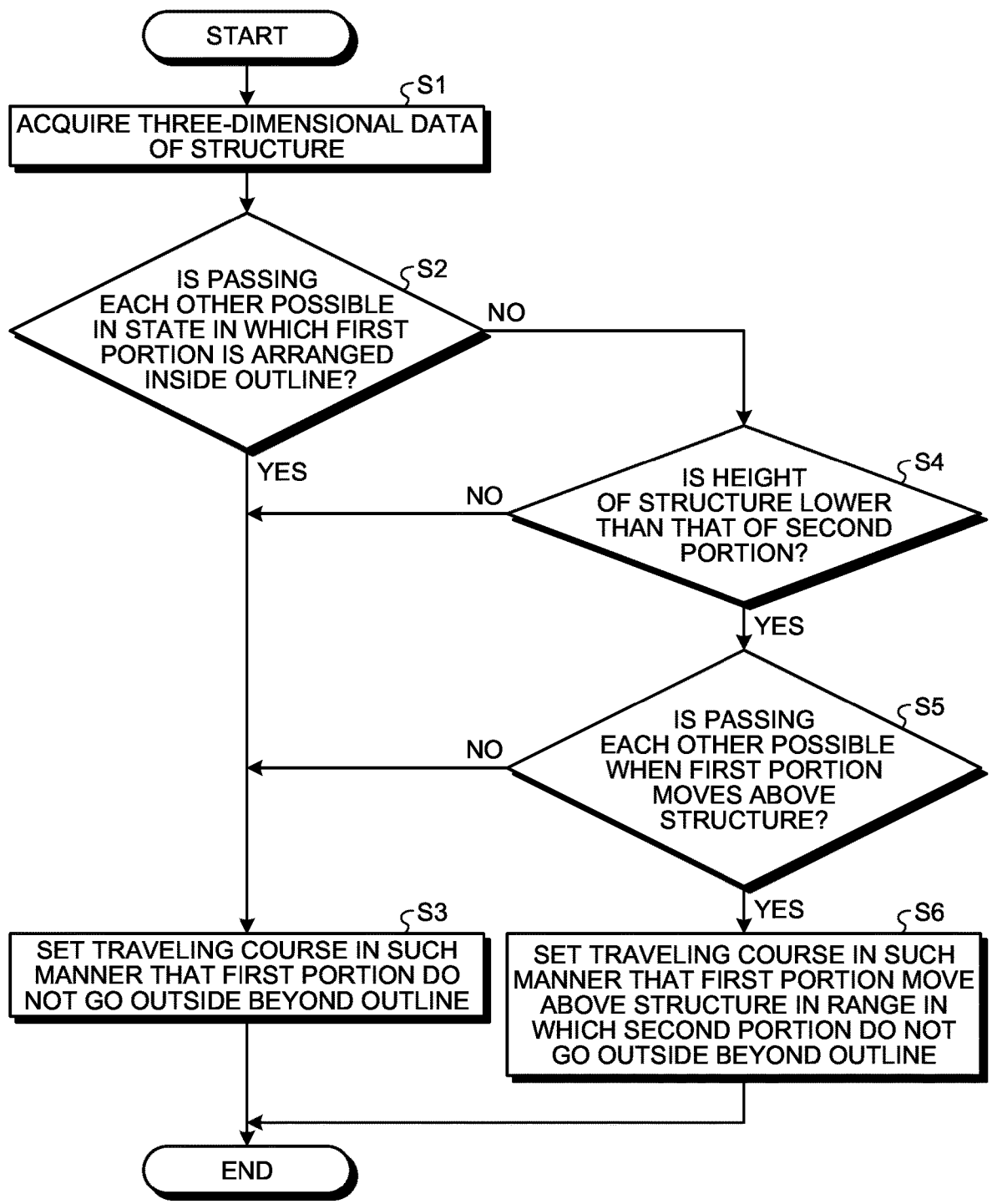

HAUL VEHICLE MANAGEMENT SYSTEM AND HAUL VEHICLE MANAGEMENT METHOD

FIELD

The present disclosure relates to a haul vehicle management system and a haul vehicle management method.

BACKGROUND

In a wide work site such as a mine, a haul vehicle that travels in an unmanned manner is used for hauling work. The haul vehicle travels on a traveling path of the work site. A traveling course of the haul vehicle is set in the traveling path. The haul vehicle is controlled to travel on the traveling path according to the traveling course.

CITATION LIST

Patent Literature

Patent Literature 1: Japanese Patent Application Laid-open No. 2019-036073

SUMMARY

Technical Problem

There is a case where a structure such as a bank or a cliff is present in the vicinity of a traveling path. A traveling course is set in such a manner that a haul vehicle does not come into contact with the structure. A width of the traveling path needs to be wide in such a manner that a first haul vehicle and a second haul vehicle can pass each other on the traveling path without coming into contact with the structure. On the other hand, it is preferable that the width of the traveling path is as narrow as possible from a viewpoint of controlling a construction cost of the traveling path, controlling a mining cost, and controlling a decrease in a mined object. In a case where the width of the traveling path is narrow, there is a possibility that the first haul vehicle and the second haul vehicle cannot pass each other on the traveling path. In a case where the first haul vehicle and the second haul vehicle cannot pass each other on the traveling path, each of the first haul vehicle and the second haul vehicle is controlled in such a manner that the second haul vehicle travels on the traveling path after the first haul vehicle travels on the traveling path, for example. When the haul vehicles decelerate or stop on the traveling path, there is a possibility that productivity at a work site is decreased.

An object of the present disclosure is to control a decrease in productivity at a work site even when a width of a traveling path is narrowed.

Solution to Problem

According to an aspect of the present invention, a haul vehicle management system comprises: a three-dimensional data acquisition unit that acquires three-dimensional data outside an outline of a traveling area where a haul vehicle can travel; and a course data generation unit that generates a traveling course of the haul vehicle on a basis of outer shape data of the haul vehicle and the three-dimensional data, the traveling course being set in the traveling area.

Advantageous Effects of Invention

According to the present disclosure, it is possible to control a decrease in productivity at a work site even when a width of a traveling path is narrowed.

BRIEF DESCRIPTION OF DRAWINGS

FIG. 11 is a flowchart illustrating a course data generation method according to the embodiment.

DESCRIPTION OF EMBODIMENTS

Although embodiments according to the present disclosure will be described hereinafter with reference to the drawings, the present disclosure is not limited thereto. Components of the embodiments described in the following can be arbitrarily combined. In addition, there is a case where a part of the components is not used.

[Management System]

Figure 1:
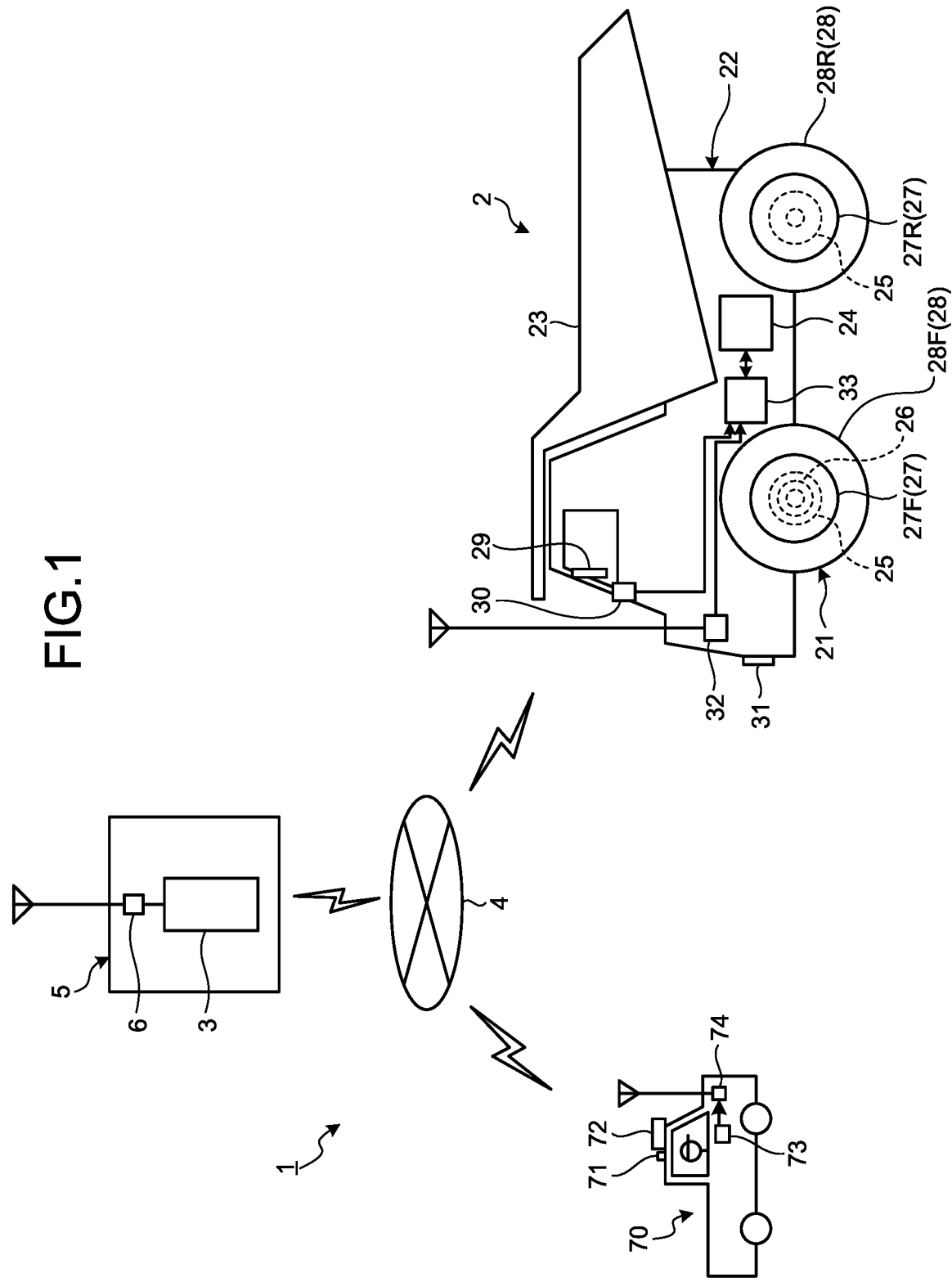
FIG. 1 is a schematic diagram illustrating a haul vehicle management system according to an embodiment.

FIG. 1 is a schematic diagram illustrating a management system 1 of a haul vehicle 2 according to an embodiment. The haul vehicle 2 is an unmanned vehicle. The unmanned vehicle means a vehicle that operates in an unmanned manner without depending on driving operation by a driver. The haul vehicle 2 operates at a work site. In the embodiment, the haul vehicle 2 is an unmanned dump truck that travels at the work site and hauls a load in an unmanned manner.

The management system 1 includes a management device 3 and a communication system 4. The management device 3 includes a computer system. The management device 3 is installed in a control facility 5 at the work site. The communication system 4 performs communication between the management device 3 and the haul vehicle 2. Wireless communication equipment 6 is connected to the management device 3. The communication system 4 includes the wireless communication equipment 6. The management device 3 and the haul vehicle 2 perform wireless communication through the communication system 4.

[Haul Vehicle]

The haul vehicle 2 includes a traveling device 21, a vehicle body 22, a dump body 23, a position detection device 30, a non-contact sensor 31, wireless communication equipment 32, and a control device 33.

The traveling device 21 causes the haul vehicle 2 to travel. The traveling device 21 supports the vehicle body 22. At least a part of the traveling device 21 is arranged below the vehicle body 22. The traveling device 21 includes a drive device 24, a brake device 25, a steering device 26, wheels 27, and tires 28. Tires 28 are mounted on the wheels 27. The wheels 27 include front wheels 27F and rear wheels 27R. The tires 28 include front tires 28F mounted on the front wheels 27F, and rear tires 28R mounted on the rear wheels 27R. The drive device 24 generates driving force to accelerate the haul vehicle 2. The drive device 24 includes an internal combustion engine such as a diesel engine. Note that the drive device 24 may include an electric motor. Power generated by the drive device 24 is transmitted to the rear wheels 27R. The brake device 25 generates braking force to decelerate or stop the haul vehicle 2. The steering device 26 can adjust a traveling direction of the haul vehicle 2. The traveling direction of the haul vehicle 2 includes a direction of a front portion of the vehicle body 22. The steering device 26 adjusts the traveling direction of the haul vehicle 2 by steering the front wheels 27F. The haul vehicle 2 travels autonomously by rotations of the wheels 27.

The dump body 23 is a member on which a load is loaded. The dump body 23 is supported by the vehicle body 22. At least a part of the dump body 23 is arranged above the vehicle body 22.

The vehicle body 22 includes side mirrors 29. The side mirrors 29 are respectively provided on a left portion and a right portion of the vehicle body 22. One of the side mirrors 29 is provided on an upper front portion of the left portion of the vehicle body 22. The other side mirror 29 is provided on an upper front portion of the right portion of the vehicle body 22. The side mirrors 29 are arranged outside the traveling device 21 and the dump body 23 in a vehicle width direction of the haul vehicle 2.

The position detection device 30 detects a position of the haul vehicle 2. The position of the haul vehicle 2 is detected by utilization of a global navigation satellite system (GNSS). The global navigation satellite system includes a global positioning system (GPS). The global navigation satellite system detects a position in a global coordinate system defined by coordinate data of latitude, longitude, and altitude. The global coordinate system is a coordinate system fixed to the earth. The position detection device 30 includes a GNSS receiver, and detects a position of the haul vehicle 2 in the global coordinate system.

The non-contact sensor 31 detects an object around the haul vehicle 2 in a non-contact manner. In the embodiment, the non-contact sensor 31 is provided below a front portion of the haul vehicle 2. The non-contact sensor 31 detects an object in front of the haul vehicle 2 in a non-contact manner. The non-contact sensor 31 three-dimensionally measures the object in front of the haul vehicle 2 and acquires three-dimensional data of the object. Examples of the non-contact sensor 31 include a laser sensor and a radar sensor. The laser sensor acquires three-dimensional data of an object by scanning the object with laser light and detecting a relative position between the haul vehicle 2 and each of a plurality of detection points of the object. The radar sensor acquires three-dimensional data of an object by scanning the object with radio waves and detecting a relative position between the haul vehicle 2 and each of a plurality of detection points of the object.

The wireless communication equipment 32 wirelessly communicates with the management device 3. The communication system 4 includes the wireless communication equipment 32.

The control device 33 controls the haul vehicle 2. The control device 33 is arranged in the vehicle body 22. The control device 33 can communicate with the management device 3 that is present outside the haul vehicle 2. The control device 33 outputs an accelerator command to operate the drive device 24, a brake command to operate the brake device 25, and a steering command to operate the steering device 26. The drive device 24 generates driving force to accelerate the haul vehicle 2 on the basis of the accelerator command output from the control device 33. A traveling speed of the haul vehicle 2 is adjusted by an adjustment of the output of the drive device 24. The brake device 25 generates braking force to decelerate the haul vehicle 2 on the basis of the brake command output from the control device 33. On the basis of the steering command output from the control device 33, the steering device 26 generates force to change a direction of the front wheels 27F in order to cause the haul vehicle 2 to move straight ahead or to turn.

[Auxiliary Vehicle]

At a work site, not only the haul vehicle 2 but also an auxiliary vehicle 70 are operated. The auxiliary vehicle 70 is a manned vehicle. The manned vehicle means a vehicle that operates on the basis of driving operation by a driver on board. An outer shape of the auxiliary vehicle 70 is smaller than an outer shape of the haul vehicle 2.

The auxiliary vehicle 70 includes a position detection device 71, a three-dimensional measuring instrument 72, an arithmetic device 73, and wireless communication equipment 74.

The position detection device 71 detects a position of the auxiliary vehicle 70. The position of the auxiliary vehicle 70 is detected by utilization of the global navigation satellite system (GNSS). The position detection device 71 includes a GNSS receiver, and detects a position of the auxiliary vehicle 70 in the global coordinate system.

The three-dimensional measuring instrument 72 three-dimensionally measures an object around the auxiliary vehicle 70 and acquires three-dimensional data of the object. The three-dimensional measuring instrument 72 measures the object in a non-contact manner. Examples of the three-dimensional measuring instrument 72 include a laser scanner. The laser scanner acquires three-dimensional data of an object by scanning the object with laser light and detecting a relative position between the auxiliary vehicle 70 and each of a plurality of detection points of the object.

The arithmetic device 73 generates three-dimensional data of the object in the global coordinate system on the basis of the detection data of the position detection device 71 and the measurement data of the three-dimensional measuring instrument 72. The three-dimensional data of the object measured by the three-dimensional measuring instrument 72 includes a plurality of detection points indicating the relative positions with respect to the auxiliary vehicle 70. The arithmetic device 73 generates three-dimensional data of the object in the global coordinate system by using detection data of the position detection device 71.

The wireless communication equipment 74 wirelessly communicates with the management device 3. The communication system 4 includes the wireless communication equipment 74.

[Work Site]

Figure 2:
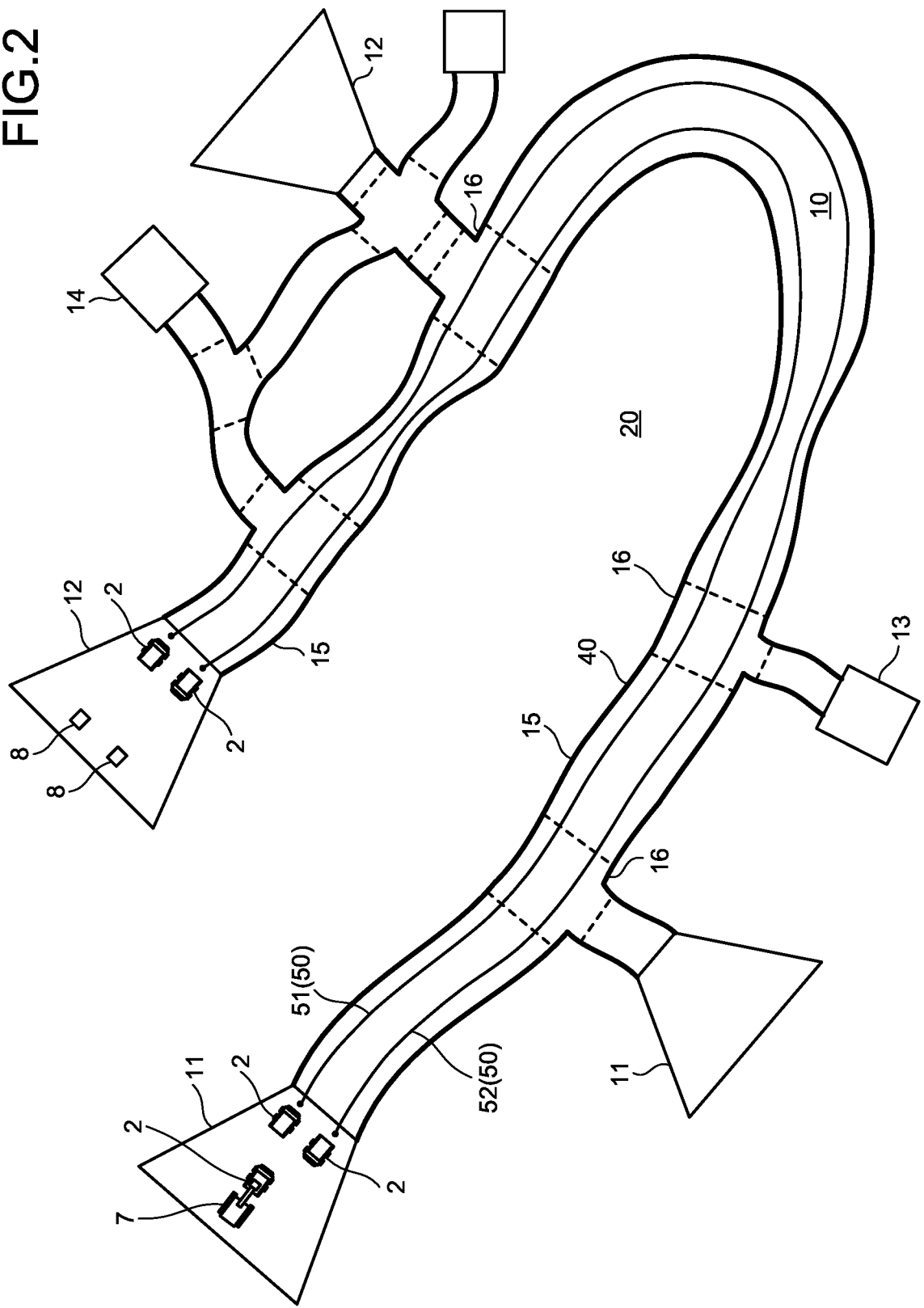
FIG. 2 is a schematic diagram illustrating a work site according to the embodiment.

FIG. 2 is a schematic diagram illustrating the work site according to the embodiment. In the present embodiment, the work site is a mine. The mine means a place or a plant where a mineral is mined. Examples of the mine include a metal mine in which metal is mined, a non-metal mine in which limestone is mined, and a coal mine in which coal is mined. Examples of a load hauled by the haul vehicle 2 include a mined object that is mined in the mine. Examples of the mined object include ore, and earth and sand.

In the embodiment, a local coordinate system is set at the work site. The local coordinate system means a coordinate system based on an origin and a coordinate axis set at an arbitrary position of an action site. A position in the global coordinate system and a position in the local coordinate system can be transformed by utilization of a transformation parameter.

A loading place 11, a soil dumping place 12, a hardstand 13, a gas filling place 14, a traveling path 15, and an intersection 16 are provided in the work site. The loading place 11 means an area where loading operation of loading a load onto the haul vehicle 2 is performed. In the loading place 11, a loader 7 such as an excavator operates. The soil dumping place 12 means an area where dumping operation of dumping the load from the haul vehicle 2 is performed. A crusher 8 is provided in the soil dumping place 12, for example. The hardstand 13 is an area where the haul vehicle 2 is parked. The gas filling place 14 is an area where filling the haul vehicle 2 with gas is performed.

The traveling path 15 is connected to each of the loading place 11, the soil dumping place 12, the hardstand 13, and the gas filling place 14. The traveling path 15 is provided in such a manner as to connect at least the loading place 11 and the soil dumping place 12. The traveling path 15 means an area where the haul vehicle 2 heading to at least one of the loading place 11, the soil dumping place 12, the hardstand 13, and the gas filling place 14 travels. The intersection 16 means an area where a plurality of traveling paths 15 intersects or an area where one traveling path 15 branches into a plurality of traveling paths 15. The haul vehicle 2 travels on the traveling path 15 and the intersection 16.

A traveling area 10 and a prohibited area 20 are set at the work site. The traveling area 10 is an area where traveling by the haul vehicle 2 is permitted. The prohibited area 20 is an area where the traveling by the haul vehicle 2 is prohibited. The haul vehicle 2 can travel in the traveling area 10. The traveling area 10 includes the loading place 11, the soil dumping place 12, the hardstand 13, the gas filling place 14, the traveling path 15, and the intersection 16.

The traveling area 10 is defined by an outline 40. The outline 40 of the traveling area 10 is a dividing line that performs division into the traveling area 10 and the prohibited area 20. The traveling area 10 is an area on one side of the outline 40, and the prohibited area 20 is an area on the other side of the outline 40. When the outline 40 surrounds the traveling area 10, the traveling area 10 is an area surrounded by the outline 40. Note that the outline 40 may not surround the traveling area 10. The outline 40 may perform division into the traveling area 10 and the prohibited area 20 linearly, for example.

The haul vehicle 2 operates at the work site on the basis of course data from the management device 3. The course data indicates a traveling condition of the haul vehicle 2. The course data includes a traveling course 50 indicating a target traveling route of the haul vehicle 2, a target traveling speed of the haul vehicle 2, and a target traveling direction of the haul vehicle 2. The traveling course 50 is set in the traveling area 10. The haul vehicle 2 travels in the traveling area 10 according to the traveling course 50.

In the embodiment, the traveling course 50 includes a first traveling course 51 and a second traveling course 52. The haul vehicle 2 travels from the loading place 11 to the soil dumping place 12 according to the first traveling course 51, and travels from the soil dumping place 12 to the loading place 11 according to the second traveling course 52.

The position of the outline 40 and the position of the traveling course 50 are defined in the local coordinate system.

[Structure]

Figure 3:
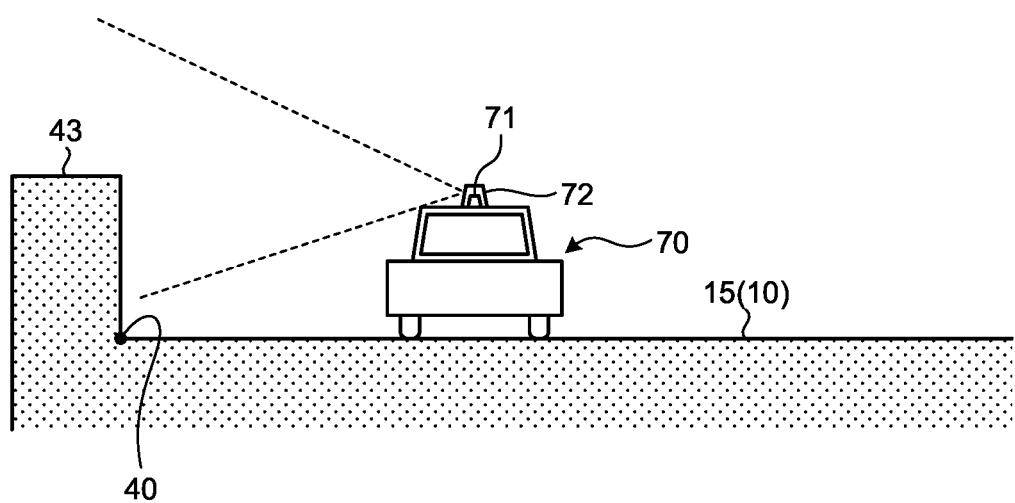
FIG. 3 is a schematic diagram illustrating a structure according to the embodiment.

FIG. 3 is a schematic diagram illustrating a structure 43 according to the embodiment. As illustrated in FIG. 3, there is a case where the structure 43 is present near the traveling path 15. Examples of the structure 43 include a bank and a cliff. Note that the structure 43 may be an artificial object such as a utility pole. The structure 43 is present outside the outline 40. An upper end portion of the structure 43 is present above a road surface of the traveling path 15. The outline 40 is a boundary line between an end of the road surface of the traveling path 15 and a lower end portion of the structure 43.

A shape of the structure 43 and a situation around the structure 43 are measured with the three-dimensional measuring instrument 72 while the auxiliary vehicle 70 travels on the traveling path 15, whereby three-dimensional data outside the outline 40 of the traveling path 15 is acquired. In a case where the structure 43 is present outside the outline 40 of the traveling path 15, three-dimensional data of the structure 43 is acquired when the structure 43 is measured with the three-dimensional measuring instrument 72 while the auxiliary vehicle 70 travels on the traveling path 15. In parallel with the measurement by the three-dimensional measuring instrument 72, the auxiliary vehicle 70 travels on the traveling path while detecting a position in the global coordinate system by the position detection device 71.

[Management Device]

Figure 4:
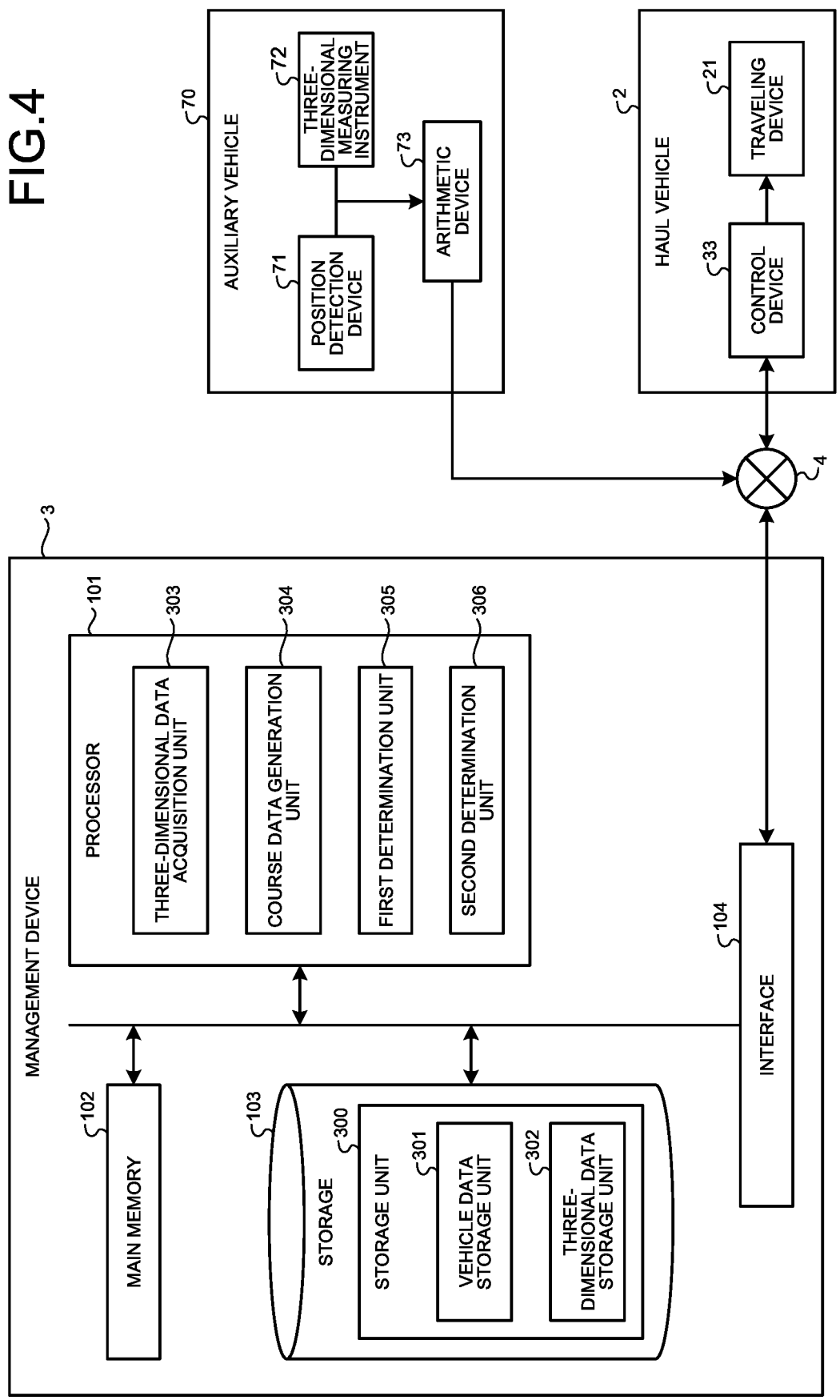
FIG. 4 is a functional block diagram illustrating a management device according to the embodiment.

FIG. 4 is a functional block diagram illustrating the management device 3 according to the embodiment. The management device 3 includes a computer system. The management device 3 includes a processor 101 such as a central processing unit (CPU), a main memory 102 including a non-volatile memory such as a read only memory (ROM) and a volatile memory such as a random access memory (RAM), a storage 103, and an interface 104 including an input/output circuit.

The management device 3 wirelessly communicates with each of the haul vehicle 2 and the auxiliary vehicle 70 via the communication system 4.

The management device 3 includes a storage unit 300, a three-dimensional data acquisition unit 303, a course data generation unit 304, a first determination unit 305, and a second determination unit 306. The processor 101 functions as the three-dimensional data acquisition unit 303, the course data generation unit 304, the first determination unit 305, and the second determination unit 306. The storage 103 functions as the storage unit 300.

The storage unit 300 includes a vehicle data storage unit 301 that stores outer shape data of the haul vehicle 2, and a three-dimensional data storage unit 302 that stores the three-dimensional data of the structure 43.

The vehicle data storage unit 301 stores the outer shape data of the haul vehicle 2. The outer shape data of the haul vehicle 2 includes an outer shape and dimensions of the haul vehicle 2. The outer shape data of the haul vehicle 2 is known data derived from design data, specification data, or the like of the haul vehicle 2, and is stored in the vehicle data storage unit 301.

The outer shape data of the haul vehicle 2 includes a dimension of the traveling device 21 in the vehicle width direction of the haul vehicle 2, a dimension of the vehicle body 22 in the vehicle width direction, a dimension of the dump body 23 in the vehicle width direction, and a dimension of the side mirrors 29 in the vehicle width direction. The dimension of the traveling device 21 in the vehicle width direction includes a distance between a left end portion of the left tire 28 and a right end portion of the right tire 28. The dimension of the vehicle body 22 in the vehicle width direction includes a distance between a left end portion of the vehicle body 22 and a right end portion of the vehicle body 22. The dimension of the dump body 23 in the vehicle width direction includes a distance between a left end portion of the dump body 23 and a right end portion of the dump body 23. The dimension of the side mirrors 29 in the vehicle width direction includes a distance between a left end portion of the side mirror 29 on the left side and a right end portion of the side mirror 29 on the right side. At least a part of the dump body 23 is arranged outside the traveling device 21 and the vehicle body 22 in the vehicle width direction of the haul vehicle 2. The side mirrors 29 are arranged outside the traveling device 21, the vehicle body 22, and the dump body 23 in the vehicle width direction of the haul vehicle 2.

In addition, the outer shape data of the haul vehicle 2 includes positions and dimensions of the tires 28 in a height direction of the haul vehicle 2, a position of the dump body 23 in the height direction, and positions and dimensions of the side mirrors 29 in the height direction.

The three-dimensional data storage unit 302 stores the three-dimensional data of the structure 43 which data is acquired by the three-dimensional measuring instrument 72 of the auxiliary vehicle 70. The three-dimensional data of the structure 43 is defined in the local coordinate system. The three-dimensional data storage unit 302 stores the three-dimensional data of the structure 43 in the local coordinate system.

The three-dimensional data acquisition unit 303 acquires three-dimensional data outside the outline 40 of the traveling area 10. In the embodiment, the three-dimensional data acquisition unit 303 acquires three-dimensional data outside the outline 40 of the traveling path 15. The three-dimensional data acquisition unit 303 acquires three-dimensional data from the arithmetic device 73 of the auxiliary vehicle 70. As described above, in parallel with the measurement by the three-dimensional measuring instrument 72, the auxiliary vehicle 70 travels on the traveling path 15 while detecting the position in the global coordinate system with the position detection device 71. The arithmetic device 73 generates the three-dimensional data of the structure 43 in the global coordinate system by using detection data of the position detection device 71. The three-dimensional data of the structure 43 is transmitted to the management device 3 via the communication system 4. The three-dimensional data acquisition unit 303 acquires the three-dimensional data of the structure 43 from the arithmetic device 73. The three-dimensional data acquisition unit 303 transforms the three-dimensional data of the structure 43 in the global coordinate system into three-dimensional data of the structure 43 in the local coordinate system, and stores the three-dimensional data in the three-dimensional data storage unit 302.

The course data generation unit 304 generates course data including the traveling course 50 of the haul vehicle 2 including the traveling course 50 of the haul vehicle 2, which traveling course is set on the traveling path 15, on the basis of the outer shape data of the haul vehicle 2 which data is stored in the vehicle data storage unit 301 and the three-dimensional data of the structure 43 which data is stored in the three-dimensional data storage unit 302.

Figure 5:
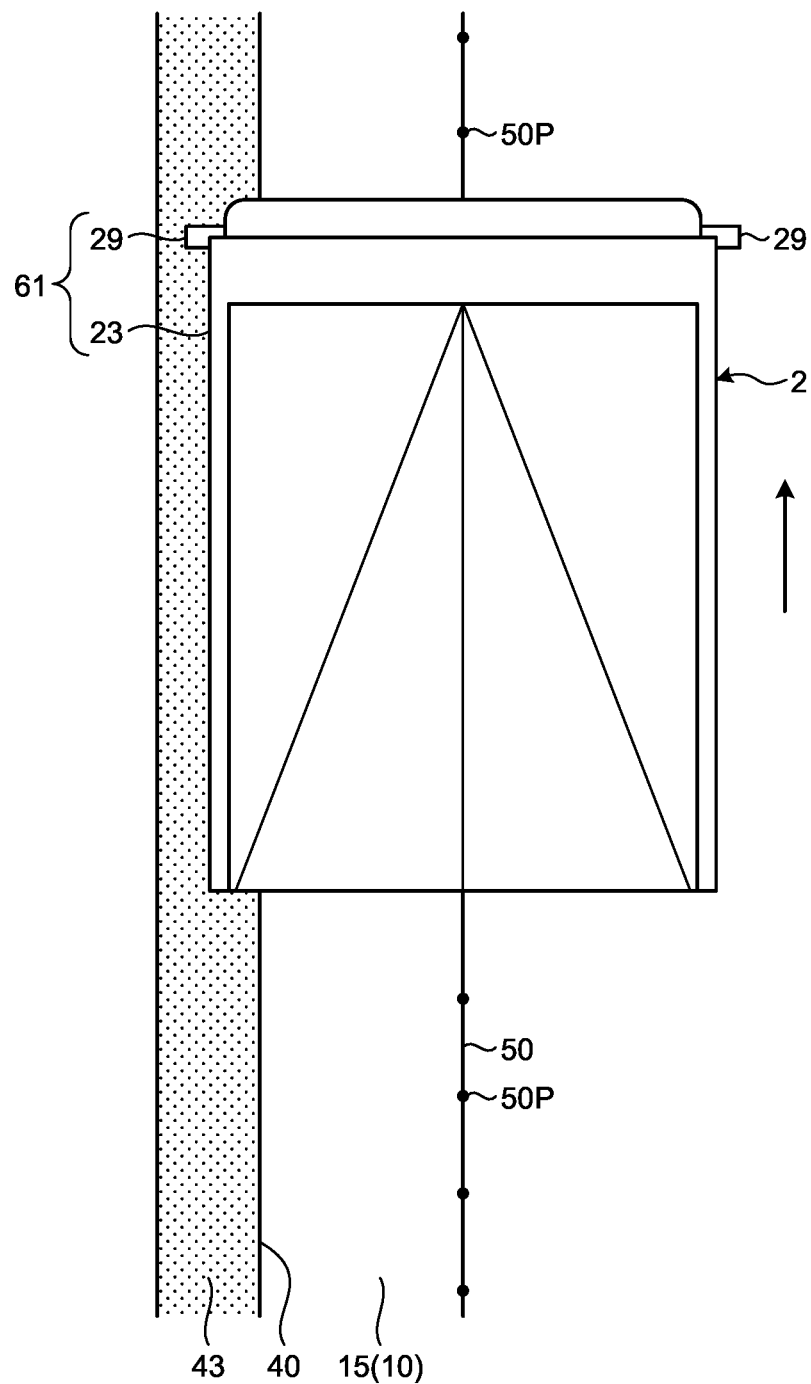
FIG. 5 is a schematic diagram for describing processing by a course data generation unit according to the embodiment.
Figure 6:
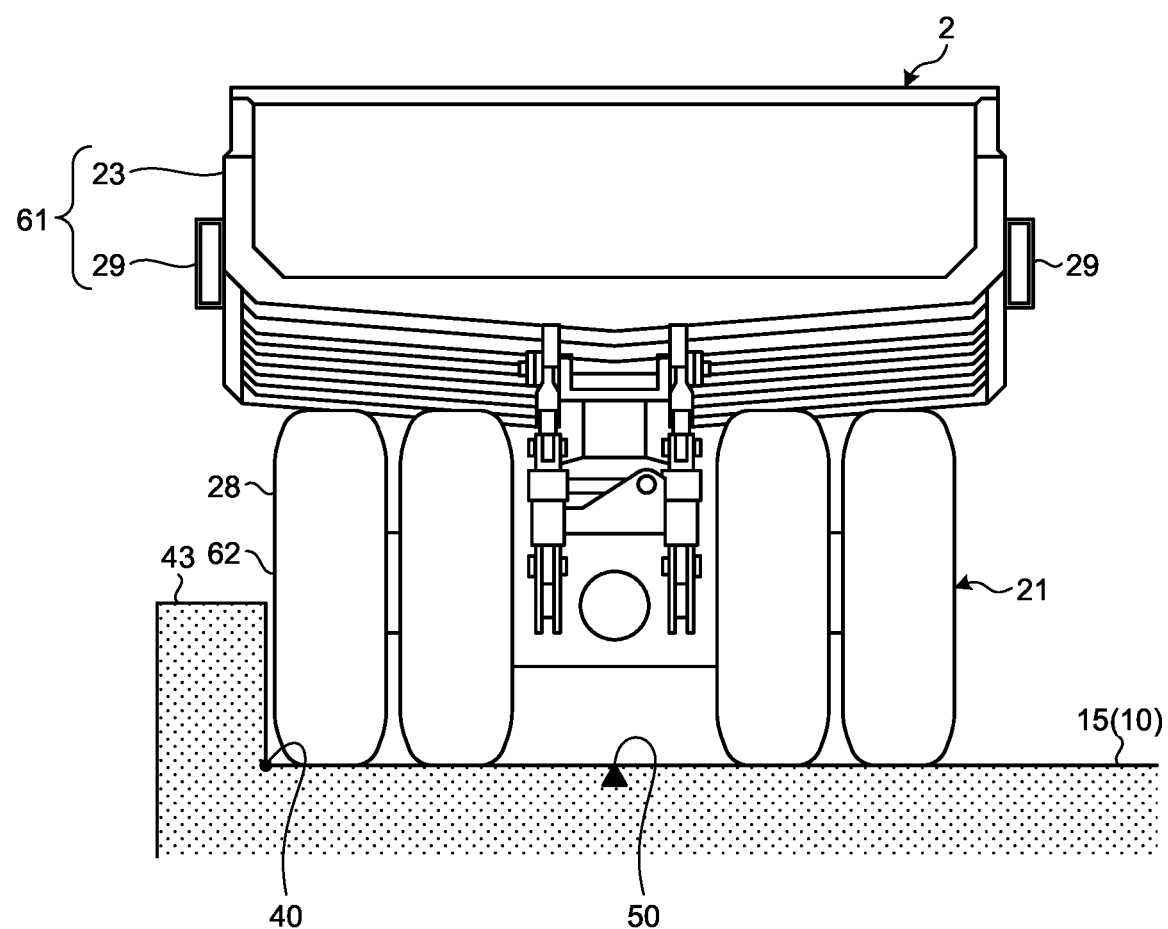
FIG. 6 is a schematic diagram for describing processing by the course data generation unit according to the embodiment.

Each of FIG. 5 and FIG. 6 is a schematic diagram for describing processing by the course data generation unit 304 according to the embodiment. FIG. 5 is a top view of the haul vehicle 2 traveling on the traveling path 15. FIG. 6 is a rear view of the haul vehicle 2 traveling on the traveling path 15.

The traveling course 50 includes a virtual line indicating the target traveling route of the haul vehicle 2. As illustrated in FIG. 5, the traveling course 50 is an aggregate of a plurality of course points 50P set at intervals. The intervals between the course points 50P may be uniform or may be different. The traveling course 50 is defined by a track passing through the plurality of course points 50P. The position of the traveling course 50 is defined in the local coordinate system. The control device 33 controls the traveling device 21 in such a manner that the haul vehicle 2 travels in a state in which a center of the haul vehicle 2 in the vehicle width direction coincides with the traveling course 50.

The three-dimensional data includes a height of the structure 43 present outside the outline 40. The height of the structure 43 means a distance between a contact area of each of the tires 28 (road surface of the traveling path 15) and an upper end portion of the structure 43 in a direction orthogonal to a predetermined surface parallel to the contact area of each of the tires 28. On the basis of the height of the structure 43, the course data generation unit 304 generates the traveling course 50 in such a manner as to permit a first portion 61 of the haul vehicle 2 to move above the structure 43. That is, in a case of determining that the first portion 61 of the haul vehicle 2 can move above the structure 43 without coming into contact with the structure 43 on the basis of the height of the structure 43 and the outer shape data of the haul vehicle 2, the course data generation unit 304 generates the traveling course 50 in such a manner as to permit the first portion 61 of the haul vehicle 2 to move above the structure 43.

The first portion 61 of the haul vehicle 2 is arranged above the traveling device 21. The first portion 61 is a portion arranged on the outermost side in the vehicle width direction of the haul vehicle 2. That is, the first portion 61 is a portion that is arranged above the traveling device 21 and that has the largest dimension in the vehicle width direction of the haul vehicle 2. As illustrated in FIG. 5 and FIG. 6, the first portion 61 is at least a part of the side mirrors 29 of the haul vehicle 2 in the embodiment. Note that the first portion 61 may be at least a part of the dump body 23 of the haul vehicle 2.

On the basis of the outer shape data of the haul vehicle 2 and the three-dimensional data of the structure 43, the course data generation unit 304 generates the traveling course 50 in such a manner that the tires 28 of the haul vehicle 2 do not come into contact with the structure 43, as illustrated in FIG. 6.

Figure 7:
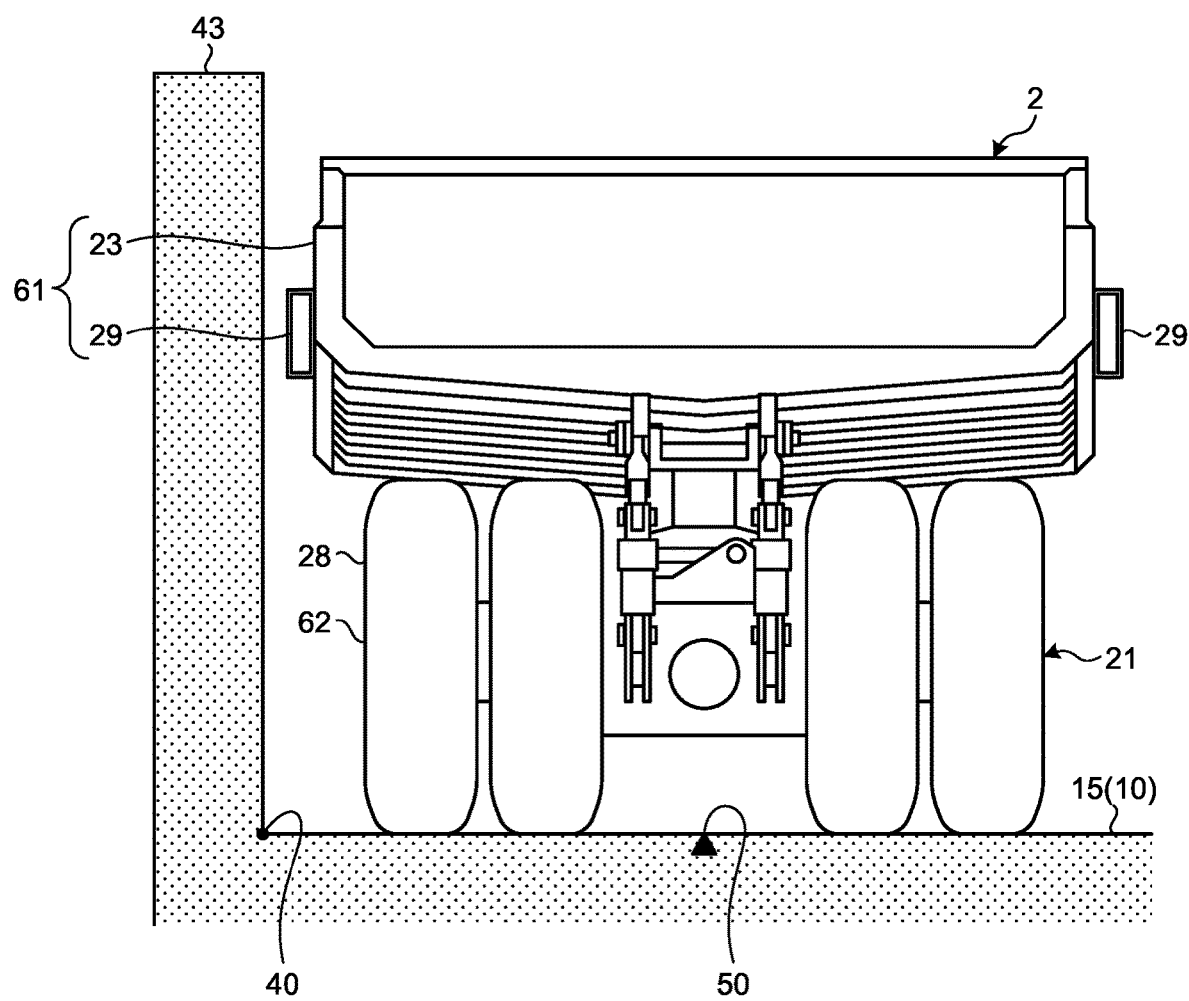
FIG. 7 is a schematic diagram for describing processing by the course data generation unit according to the embodiment.

FIG. 7 is a schematic diagram for describing processing by the course data generation unit 304 according to the embodiment. FIG. 7 is a rear view of the haul vehicle 2 traveling on the traveling path 15. As illustrated in FIG. 7, there is a case where the height of the structure 43 is higher than the height of the first portion 61. In a case of determining that the first portion 61 of the haul vehicle 2 cannot move above the structure 43 on the basis of the height of the structure 43 and the outer shape data of the haul vehicle 2, the course data generation unit 304 generates the traveling course 50 in such a manner that the first portion 61 of the haul vehicle 2 moves inside the outline 40. That is, in a case where the height of the structure 43 is higher than the height of the first portion 61, the course data generation unit 304 generates the traveling course 50 in such a manner that the first portion 61 of the haul vehicle 2 does not go outside beyond the outline 40.

In the embodiment, when determining that the height of the structure 43 is higher than a height of a second portion 62 of the haul vehicle 2, the course data generation unit 304 generates the traveling course 50 in such a manner that the first portion 61 of the haul vehicle 2 moves inside the outline 40. The second portion 62 is set at a lower position than the first portion 61. The second portion 62 is arranged inside the first portion 61 in the vehicle width direction of the haul vehicle 2. In the vehicle width direction of the haul vehicle 2, a distance between the center of the haul vehicle 2 and the second portion 62 is shorter than a distance between the center of the haul vehicle 2 and the first portion 61.

In the embodiment, the second portion 62 includes the tires 28 of the haul vehicle 2. When determining that the height of the structure 43 is higher than a height of a rotation center of the tires 28, the course data generation unit 304 generates the traveling course 50 in such a manner that the first portion 61 of the haul vehicle 2 moves inside the outline 40. Note that when determining that the height of the structure 43 is higher than a height of upper end portions of the tires 28, the course data generation unit 304 may generate the traveling course 50 in such a manner that the first portion 61 of the haul vehicle 2 moves inside the outline 40. When determining that the height of the structure 43 is lower than the height of the second portion 62 of the haul vehicle 2, the course data generation unit 304 generates the traveling course 50 in such a manner as to permit the first portion 61 of the haul vehicle 2 to move above the structure 43.

On the basis of the outer shape data of the haul vehicle 2 and the three-dimensional data of the structure 43, the course data generation unit 304 generates the traveling course 50 in such a manner that each of the first portion 61 and the tires 28 of the haul vehicle 2 do not come into contact with the structure 43, as illustrated in FIG. 7.

As described above, in a case where it is determined that the first portion 61 of the haul vehicle 2 can move above the structure 43 without coming into contact with the structure 43, the traveling course 50 is generated in such a manner as to permit the first portion 61 of the haul vehicle 2 to move above the structure 43. Thus, even when the width of the traveling path 15 is narrow, the haul vehicle 2 can travel on the traveling path 15. In a case where it is determined that the first portion 61 of the haul vehicle 2 cannot move above the structure 43, the traveling course 50 is generated in such a manner that the first portion 61 of the haul vehicle 2 is arranged inside the outline 40. Thus, the haul vehicle 2 can travel on the traveling path 15 without coming into contact with the structure 43.

In the embodiment, the traveling course 50 includes the first traveling course 51 and the second traveling course 52. In the traveling path 15, there is a possibility that a first haul vehicle 2A and a second haul vehicle 2B pass each other on the traveling path 15. It is determined whether the first haul vehicle 2A and the second haul vehicle 2B can pass each other on the traveling path on the basis of the width of the traveling path 15 at a portion where the first haul vehicle 2A and the second haul vehicle 2B pass each other in the traveling area 10.

The first determination unit 305 determines, on the basis of the width of the traveling path 15, whether the first haul vehicle 2A and the second haul vehicle 2B can pass each other on the traveling path 15 in a state in which the first portion 61 of each thereof is arranged inside the outline 40.

In a case where the first determination unit 305 determines that the first haul vehicle 2A and the second haul vehicle 2B cannot pass each other on the traveling path 15, the second determination unit 306 determines whether the first haul vehicle 2A and the second haul vehicle 2B can pass each other on the traveling path 15 when the first portion 61 of each thereof moves above the structure 43.

Figure 8:
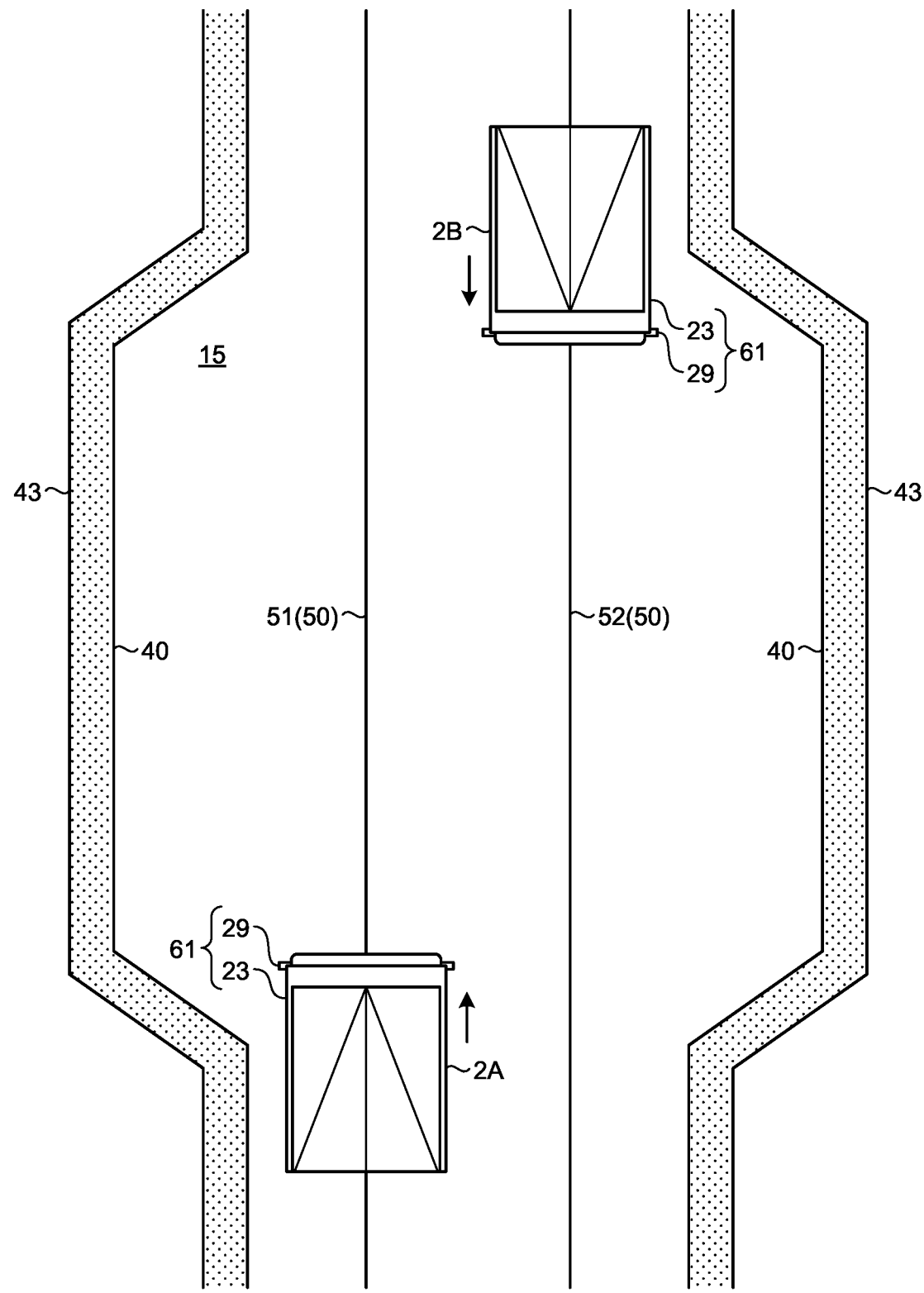
FIG. 8 is a schematic diagram for describing processing by a first determination unit and a second determination unit according to the embodiment.
Figure 9:
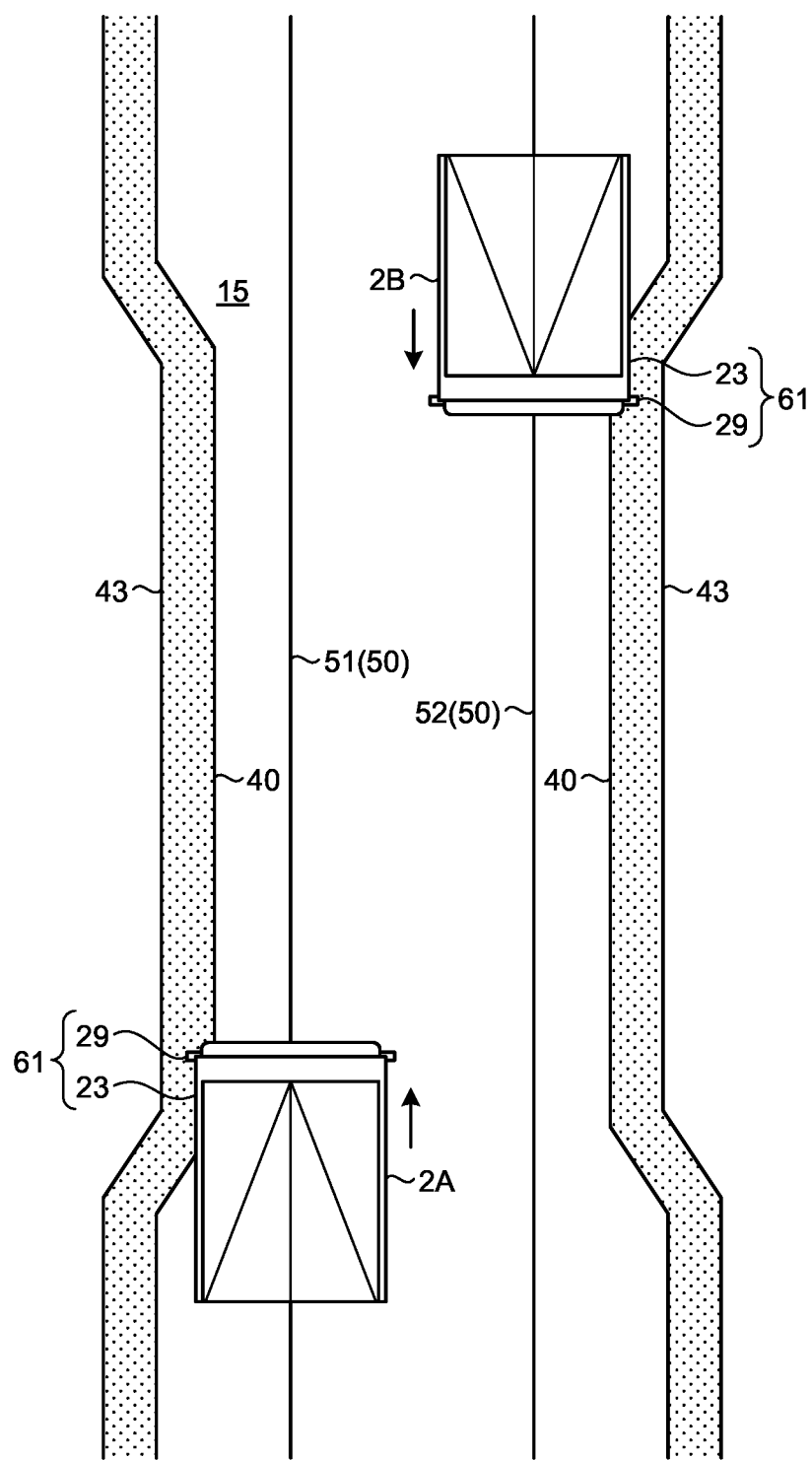
FIG. 9 is a schematic diagram for describing processing by the first determination unit and the second determination unit according to the embodiment.
Figure 10:
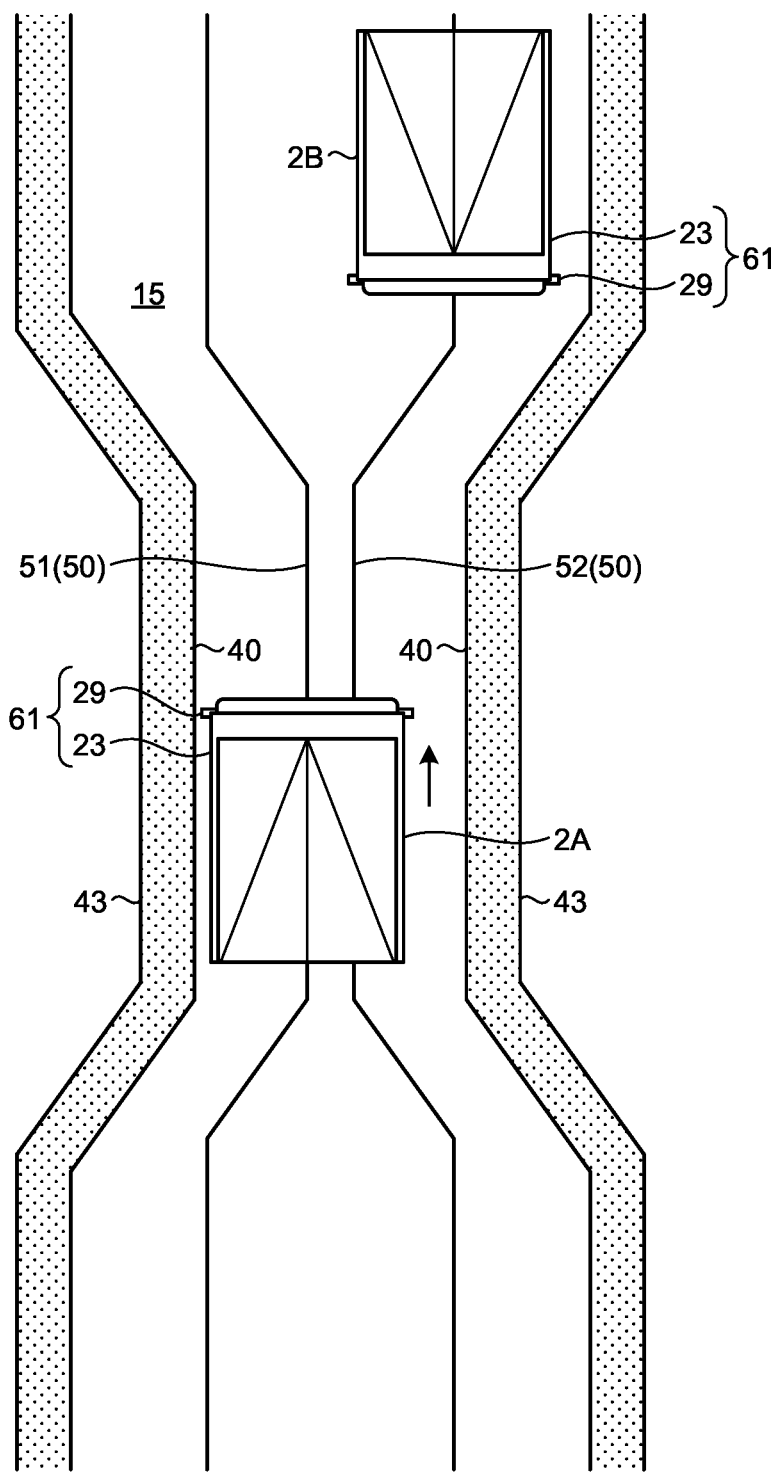
FIG. 10 is a schematic diagram for describing processing by the first determination unit and the second determination unit according to the embodiment.

Each of FIG. 8, FIG. 9, and FIG. 10 is a schematic diagram for describing processing by the first determination unit 305 and the second determination unit 306 according to the embodiment.

As illustrated in FIG. 8, in a case where the traveling path 15 is sufficiently wide, the first haul vehicle 2A and the second haul vehicle 2B can pass each other on the traveling path 15 without making the first portion 61 of each thereof move above the structure 43. In a case of an example illustrated in FIG. 8, on the basis of the width of the traveling path 15, outer shape data of the first haul vehicle 2A, and outer shape data of the second haul vehicle 2B, the first determination unit 305 determines that the first haul vehicle 2A and the second haul vehicle 2B can pass each other on the traveling path in a state in which the first portion 61 of each of the first haul vehicle 2A and the second haul vehicle 2B is arranged inside the outline 40.

In the case of the example illustrated in FIG. 8, that is, in a case where the first determination unit 305 determines that the first haul vehicle 2A and the second haul vehicle 2B can pass each other on the traveling path 15, the course data generation unit 304 sets the traveling course 50 of each of the first haul vehicle 2A and the second haul vehicle 2B in such a manner that the first portion 61 of each thereof moves inside the outline 40. As illustrated in FIG. 8, a first traveling course 51 is set for the first haul vehicle 2A, and a second traveling course 52 is set for the second haul vehicle 2B. In a case where the width of the traveling path 15 is sufficiently wide, the course data generation unit 304 can set the traveling course 50 linearly. Thus, each of the first haul vehicle 2A and the second haul vehicle 2B can travel at a high speed. In addition, an increase in a travel distance of each of the first haul vehicle 2A and the second haul vehicle 2B is controlled.

As illustrated in FIG. 9, in a case where the width of the traveling path 15 is narrow, the first haul vehicle 2A and the second haul vehicle 2B cannot pass each other on the traveling path 15 in a state in which the first portion 61 of each of the first haul vehicle 2A and the second haul vehicle 2B is arranged inside the outline 40. However, when each of the first haul vehicle 2A and the second haul vehicle 2B becomes closer to the structure 43 in such a manner that the first portion 61 of each thereof moves above the structure 43, the first haul vehicle 2A and the second haul vehicle 2B can pass each other on the traveling path 15. In a case of an example illustrated in FIG. 9, the second determination unit 306 determines that the first haul vehicle 2A and the second haul vehicle 2B can pass each other on the traveling path when the first portion 61 of each thereof moves above the structure 43.

In the embodiment, when determining that the height of the structure 43 is higher than the height of the second portion 62 of the haul vehicle 2, the course data generation unit 304 generates the traveling course 50 in such a manner that the first portion 61 moves inside the outline 40 instead of moving above the structure 43, as described with reference to FIG. 7. In a case of determining that the height of the structure 43 is lower than the height of the second portion 62 of the haul vehicle 2, the second determination unit 306 determines that the first haul vehicle 2A and the second haul vehicle 2B can pass each other on the traveling path 15.

In the case of the example illustrated in FIG. 9, that is, in a case where the second determination unit 306 determines that the first haul vehicle 2A and the second haul vehicle 2B can pass each other on the traveling path 15, the course data generation unit 304 generates the traveling course 50 of each of the first haul vehicle 2A and the second haul vehicle 2B in such a manner that the first portion 61 of each thereof moves above the structure 43. As illustrated in FIG. 9, the first traveling course 51 is set for the first haul vehicle 2A, and the second traveling course 52 is set for the second haul vehicle 2B. Even when the width of the traveling path 15 is narrow, decelerating and stopping of each of the first haul vehicle 2A and the second haul vehicle 2B are controlled when the first portion 61 of each thereof moves above the structure 43. Each of the first haul vehicle 2A and the second haul vehicle 2B can travel at a high speed.

As illustrated in FIG. 10, in a case where the traveling path 15 is narrower, the first haul vehicle 2A and the second haul vehicle 2B cannot pass each other on the traveling path 15 even when the first portion 61 of each thereof moves above the structure 43.

In a case of an example illustrated in FIG. 10, that is, in a case where the second determination unit 306 determines that the first haul vehicle 2A and the second haul vehicle 2B cannot pass each other on the traveling path 15, the course data generation unit 304 generates course data indicating a traveling condition including the traveling course 50 in such a manner that the second haul vehicle 2B travels on the traveling path 15 after the first haul vehicle 2A travels on the traveling path 15. Note that the course data generation unit 304 may generate the course data indicating the traveling condition including the traveling course 50 in such a manner that the first haul vehicle 2A travels on the traveling path 15 after the second haul vehicle 2B travels on the traveling path 15.

[Course Data Generation Method]

FIG. 11 is a flowchart illustrating the course data generation method according to the embodiment. The three-dimensional measuring instrument 72 of the auxiliary vehicle 70 three-dimensionally measures the structure 43. The arithmetic device 73 calculates three-dimensional data of the structure 43 in the global coordinate system on the basis of detection data of the position detection device 71 of when the three-dimensional measuring instrument 72 three-dimensionally measures the structure 43. The three-dimensional data of the structure 43 is transmitted to the management device 3 from the arithmetic device 73 via the communication system 4. The three-dimensional data acquisition unit 303 acquires the three-dimensional data of the structure 43 outside the outline 40 of the traveling path 15 (Step S1).

The three-dimensional data acquisition unit 303 transforms the three-dimensional data of the structure 43 in the global coordinate system, which data is transmitted from the arithmetic device 73, into three-dimensional data of the structure 43 in the local coordinate system, and stores the three-dimensional data in the three-dimensional data storage unit 302.

On the basis of the width of the traveling path 15, the first determination unit 305 determines whether the first haul vehicle 2A and the second haul vehicle 2B can pass each other on the traveling path 15 in a state in which the first portion 61 of each of the haul vehicles 2 is arranged inside the outline 40 (Step S2).

In a case where it is determined in Step S2 that the first haul vehicle 2A and the second haul vehicle 2B can pass each other on the traveling path 15 (Step S2: Yes), the course data generation unit 304 sets the traveling course 50 of each of the first haul vehicle 2A and the second haul vehicle 2B in such a manner that the first portion 61 of each thereof does not go outside beyond the outline 40 (Step S3).

Each of the first haul vehicle 2A and the second haul vehicle 2B travels on the traveling path 15 according to the traveling course 50 generated in Step S3.

In a case where it is determined in Step S2 that the first haul vehicle 2A and the second haul vehicle 2B cannot pass each other on the traveling path 15 (Step S2: No), the second determination unit 306 determines whether the height of the structure 43 is lower than the height of the second portion 62 of each of the haul vehicles 2 (Step S4).

In a case where it is determined in Step S4 that the height of the structure 43 is lower than the height of the second portion 62 of each of the haul vehicles 2 (Step S4: Yes), the second determination unit 306 determines whether the first haul vehicle 2A and the second haul vehicle 2B can pass each other on the traveling path 15 when the first portion 61 of each of the haul vehicles 2 moves above the structure 43 (Step S5).

In a case where it is determined in Step S5 that the first haul vehicle 2A and the second haul vehicle 2B can pass each other on the traveling path 15 (Step S5: Yes), the course data generation unit 304 generates the traveling course 50 of each of the first haul vehicle 2A and the second haul vehicle 2B in such a manner that the first portion 61 of each thereof moves above the structure 43 within a range in which the second portion 62 of each thereof does not go outside beyond the outline (Step S6).

Each of the first haul vehicle 2A and the second haul vehicle 2B travels on the traveling path 15 according to the traveling course 50 generated in Step S6.

In a case where it is determined in Step S4 that the height of the structure 43 is higher than the height of the second portion 62 of the haul vehicle 2 (Step S4: No), the course data generation unit 304 sets the traveling course 50 of each of the first haul vehicle 2A and the second haul vehicle 2B in such a manner that the first portion 61 of each thereof does not go outside beyond the outline 40 (Step S3).

In a case where it is determined in Step S5 that the first haul vehicle 2A and the second haul vehicle 2B cannot pass each other on the traveling path 15 (Step S5: No), the course data generation unit 304 sets the traveling course 50 of each of the first haul vehicle 2A and the second haul vehicle 2B in such a manner that the first portion 61 of each thereof does not go outside beyond the outline 40 (Step S3).

Each of the first haul vehicle 2A and the second haul vehicle 2B travels on the traveling path 15 according to the course data generated in Step S3.

[Effect]

As described above, three-dimensional data outside the outline 40 of the traveling path 15 is acquired according to the embodiment. The course data generation unit 304 generates the traveling course 50 of the haul vehicle 2, which traveling course is set on the traveling path 15, on the basis of the outer shape data of the haul vehicle 2 and the three-dimensional data outside the outline 40 of the traveling path 15. As a result, even when the width of the traveling path 15 is narrowed, a decrease in productivity at the work site is controlled. As the width of the traveling path 15 becomes narrow, a construction cost of the traveling path 15 is controlled, a mining cost is controlled, and a decrease in the mined object at the work site is controlled.

For example, in a case where the traveling course 50 is generated without consideration of the three-dimensional data outside the outline 40 of the traveling path 15, the traveling course 50 is generated in such a manner that the first portion 61 moves inside the outline regardless of the height of the structure 43. That is, the traveling course 50 is generated in such a manner that the haul vehicle 2 does not move out of the outline 40 regardless of the height of the structure 43. The width of the traveling path 15 needs to be wide in such a manner that the first haul vehicle 2A and the second haul vehicle 2B can pass each other on the traveling path 15. On the other hand, from a viewpoint of controlling a decrease in productivity at the work site, the width of the traveling path 15 is preferably as narrow as possible. In a case where the width of the traveling path 15 is narrow, labor for construction of the traveling path 15 is decreased, and a decrease in the mined object is controlled. In a case where the width of the traveling path 15 is narrow, there is a possibility that the first haul vehicle 2A and the second haul vehicle 2B cannot pass each other on the traveling path 15. In a case where the first haul vehicle 2A and the second haul vehicle 2B cannot pass each other on the traveling path 15, each of the first haul vehicle 2A and the second haul vehicle 2B is controlled in such a manner that the second haul vehicle 2B travels on the traveling path 15 after the first haul vehicle 2A travels on the traveling path 15, for example. When at least one of the first haul vehicle 2A and the second haul vehicle 2B decelerates or stops in the traveling path 15, there is a possibility that productivity at the work site is decreased.

In the embodiment, the height of the structure 43 is acquired as the three-dimensional data. In a case where it is determined that the first portion 61 of the haul vehicle 2 can move above the structure 43 on the basis of the outer shape data of the haul vehicle 2 and the height of the structure 43, the course data generation unit 304 generates the traveling course 50 in such a manner that the first portion 61 of the haul vehicle 2 moves above the structure 43. That is, the course data generation unit 304 generates the traveling course 50 in such a manner that the haul vehicle 2 travels in a state of being close to the structure 43. As a result, even when the width of the traveling path 15 is narrow, the first haul vehicle 2A and the second haul vehicle 2B can pass each other on the traveling path 15. Since decelerating and stopping of the haul vehicle 2 on the traveling path 15 are controlled, a decrease in productivity at the work site is controlled even when the width of the traveling path 15 is reduced.

In the embodiment, the first determination unit 305 determines, on the basis of the width of the traveling path 15, whether the first haul vehicle 2A and the second haul vehicle 2B can pass each other on the traveling path in a state in which the first portion 61 of each thereof is arranged inside the outline 40. In a case where the first determination unit 305 determines that the first haul vehicle 2A and the second haul vehicle 2B can pass each other on the traveling path 15, that is, in a case where it is determined that the width of the traveling path 15 is sufficiently wide, the traveling course 50 of each of the first haul vehicle 2A and the second haul vehicle 2B is set in such a manner that the first portion 61 of each thereof moves inside the outline 40. That is, in a case where the width of the traveling path 15 is sufficiently wide, the traveling course 50 is set in such a manner that each of the haul vehicles 2 travels in a state of being away from the structure 43. In a case where the width of the traveling path 15 is sufficiently wide, the haul vehicles 2 can travel at a high speed when the traveling course 50 is set linearly. Thus, a decrease in productivity at the work site is controlled.

In the embodiment, in a case where the first determination unit 305 determines that the first haul vehicle 2A and the second haul vehicle 2B cannot pass each other on the traveling path 15, the second determination unit 306 determines whether the first haul vehicle 2A and the second haul vehicle 2B can pass each other on the traveling path 15 when the first portion 61 of each thereof moves above the structure 43. In a case where the second determination unit 306 determines that the first haul vehicle 2A and the second haul vehicle 2B can pass each other on the traveling path 15, the traveling course 50 of each of the first haul vehicle 2A and the second haul vehicle 2B is generated in such a manner that the first portion 61 of each thereof moves above the structure 43. That is, in a case where it is determined that the first haul vehicle 2A and the second haul vehicle 2B can pass each other on the traveling path 15 when the haul vehicles 2 travel in a state of being close to the structure 43 although the width of the traveling path 15 is narrow, the course data generation unit 304 sets the traveling course 50 in such a manner that each of the haul vehicles 2 travels in a state of being close to the structure 43. As a result, even when the width of the traveling path 15 is narrow, decelerating and stopping of the haul vehicles 2 on the traveling path 15 are controlled. Thus, a decrease in productivity at the work site is controlled.

In a case where the height of the structure 43 is higher than the height of the second portions 62 and the second determination unit 306 determines that the first haul vehicle 2A and the second haul vehicle 2B cannot pass each other on the traveling path 15, the course data indicating the traveling condition including the traveling course 50 is generated in such a manner that the second haul vehicle 2B travels on the traveling path 15 after the first haul vehicle 2A travels on the traveling path 15. As a result, contact between the first haul vehicle 2A and the second haul vehicle 2B is controlled. Thus, a decrease in productivity at the work site is controlled.

The determination whether to move each of the first portions 61 above the structure 43 is performed on the basis of the comparison between the height of the structure 43 and the height of the second portions 62 instead of the comparison between the height of the structure 43 and the height of the first portions 61. The height of the second portions 62 is lower than the height of the first portions 61. As a result, each of the first portions 61 can move above the structure 43 in a state of being sufficiently away from the structure 43. Thus, contact between each of the haul vehicles 2 and the structure 43 is controlled.

OTHER EMBODIMENTS

In the above-described embodiment, the three-dimensional data of the structure 43 is acquired by the three-dimensional measuring instrument 72 of the auxiliary vehicle 70. The three-dimensional data of the structure 43 may be acquired by the non-contact sensor 31 provided in the haul vehicle 2. The three-dimensional data of the structure 43 may be acquired by a flight vehicle that flies along the structure 43. Examples of the flight vehicle include a drone. A three-dimensional measuring instrument is mounted on the flight vehicle. Examples of the three-dimensional measuring instrument include a stereo camera and a laser range finder. The three-dimensional data of the structure 43 may be acquired by actual measurement of the structure 43.

In the above-described embodiment, the outline 40 may be measured by the auxiliary vehicle 70.

In the above-described embodiment, the three-dimensional data of the structure 43, the position of the outline 40, and the position of the traveling course 50 may be defined in the global coordinate system.

In the above-described embodiment, when determining that the height of the structure 43 is higher than the height of the second portion 62 of the haul vehicle 2, the course data generation unit 304 generates the traveling course 50 in such a manner that the haul vehicle 2 moves inside the outline 40. When determining that the height of the structure 43 is higher than the height of the first portion 61 of the haul vehicle 2, the course data generation unit 304 may generate the traveling course 50 in such a manner that the haul vehicle 2 moves inside the outline 40. In addition, when determining that the height of the structure 43 is lower than the height of the first portion 61, the second determination unit 306 may determine that the first haul vehicle 2A and the second haul vehicle 2B can pass each other on the traveling path 15.

In the above-described embodiment, the structure 43 may not be present in the vicinity of at least a part of the traveling path 15.

In the above-described embodiment, the three-dimensional data of the structure 43 outside the outline 40 of the traveling path 15 is acquired. In addition, it is determined whether the first haul vehicle 2A and the second haul vehicle 2B can pass each other on the traveling path 15. The three-dimensional data of the structure 43 outside the outline 40 of at least one of the loading place 11, the soil dumping place 12, the hardstand 13, and the gas filling place 14 may be acquired. It may be determined whether the first haul vehicle 2A and the second haul vehicle 2B can pass each other on at least one of the loading place 11, the soil dumping place 12, the hardstand 13, and the gas filling place 14.

REFERENCE SIGNS LIST

1 MANAGEMENT SYSTEM
2 HAUL VEHICLE
2A FIRST HAUL VEHICLE
2B SECOND HAUL VEHICLE
3 MANAGEMENT DEVICE
4 COMMUNICATION SYSTEM
5 CONTROL FACILITY
6 WIRELESS COMMUNICATION EQUIPMENT
7 LOADER
8 CRUSHER
10 TRAVELING AREA
11 LOADING PLACE
12 SOIL DUMPING PLACE
13 HARDSTAND
14 GAS FILLING PLACE
15 TRAVELING PATH
16 INTERSECTION
20 PROHIBITED AREA
21 TRAVELING DEVICE
22 VEHICLE BODY
23 DUMP BODY
24 DRIVE DEVICE
25 BRAKE DEVICE
26 STEERING DEVICE
27 WHEEL
27F FRONT WHEEL
27R REAR WHEEL
28 TIRE
28F FRONT TIRE
28R REAR TIRE
29 SIDE MIRROR
60 POSITION DETECTION DEVICE
31 NON-CONTACT SENSOR
32 WIRELESS COMMUNICATION EQUIPMENT
33 CONTROL DEVICE
40 OUTLINE
43 STRUCTURE
50 TRAVELING COURSE
50P COURSE POINT
51 FIRST TRAVELING COURSE
52 SECOND TRAVELING COURSE
61 FIRST PORTION
62 SECOND PORTION
70 AUXILIARY VEHICLE
71 POSITION DETECTION DEVICE
72 THREE-DIMENSIONAL MEASURING INSTRUMENT
73 ARITHMETIC DEVICE
74 WIRELESS COMMUNICATION EQUIPMENT
101 PROCESSOR
102 MAIN MEMORY
103 STORAGE
104 INTERFACE
300 STORAGE UNIT
301 VEHICLE DATA STORAGE UNIT
302 THREE-DIMENSIONAL DATA STORAGE UNIT
303 THREE-DIMENSIONAL DATA ACQUISITION UNIT
304 COURSE DATA GENERATION UNIT
305 FIRST DETERMINATION UNIT
306 SECOND DETERMINATION UNIT

The invention claimed is:

1. A haul vehicle management system comprising:
a processor and a memory, the memory including computer executable instructions configured to cause the processor to:
acquire data indicative of an outer shape of a haul vehicle;
acquire three-dimensional data outside an outline of a traveling area where the haul vehicle can travel, wherein the three-dimensional data includes a height of a structure present outside the outline;
generate a traveling course of the haul vehicle on a basis of the outer shape data of the haul vehicle and the three-dimensional data, the traveling course being set in the traveling area;
generate the traveling course, on a basis of the height of the structure, wherein
when it is determined that a first portion of the haul vehicle can move above the structure, the traveling course is generated in such a manner as to permit a first portion of the haul vehicle to move above the structure,
when it is determined that the height of the structure is higher than a height of a second portion of the haul vehicle, the traveling course is generated in such a manner that the first portion of the haul vehicle moves inside the outline of the traveling area, and provide, on the basis of the generated traveling course, a signal to a traveling device to cause the haul vehicle to travel along the generated traveling course.

2. The haul vehicle management system according to claim 1, wherein the computer executable instructions configured to cause the processor to make a first determination, on a basis of a width of the traveling area, whether a first haul vehicle and a second haul vehicle can pass each other in a state in which the first portion of each thereof is arranged inside the outline, and make a second determination whether the first haul vehicle and the second haul vehicle can pass each other when the first portion of each thereof moves above the structure in a case where the first determination is such that the first haul vehicle and the second haul vehicle cannot pass each other, wherein the processor is configured to generate the traveling course of each of the first haul vehicle and the second haul vehicle in such a manner that the first portion of each thereof moves above the structure in a case where the second determination is such that the first haul vehicle and the second haul vehicle can pass each other.

3. The haul vehicle management system according to claim 2, wherein the processor is configured to determine that the first haul vehicle and the second haul vehicle can pass each other when determining that the height of the structure is lower than that of the second portion.

4. The haul vehicle management system according to claim 2, wherein the processor is configured to generate each of the traveling courses in such a manner that the first portion of the haul vehicle does not go outside beyond the outline in a case where the second determination is such that the first haul vehicle and the second haul vehicle cannot pass each other.

5. The haul vehicle management system according to claim 2, wherein the processor is configured to set the traveling course of each of the first haul vehicle and the second haul vehicle in such a manner that the first portion of each thereof moves inside the outline in a case where the first determination is such that the first haul vehicle and the second haul vehicle cannot pass each other.

6. The haul vehicle management system according to claim 1, wherein the second portion includes tires of the haul vehicle.

7. The haul vehicle management system according to claim 1, wherein the first portion includes at least one of a dump body and a side mirror of the haul vehicle.

8. The haul vehicle management system according to claim 1, wherein the processor is configured to generate the traveling course in such a manner that tires of the haul vehicle do not come into contact with the structure.

9. A haul vehicle management method comprising:

acquiring data indicative of an outer shape of a haul vehicle;

acquiring three-dimensional data outside an outline of a traveling area where the haul vehicle can travel;

determining whether:
a first portion of the haul vehicle can move above a structure outside of the outline of the traveling area, and
a height of the structure is higher than a height of a second portion of the haul vehicle;

generating a traveling course of the haul vehicle on a basis of the three-dimensional data, including the height of the structure, the outer shape data of the haul vehicle, and the determining step, the traveling course being set in the traveling area in such a manner as to permit a first portion of the haul vehicle to move above the structure and/or in such a manner that the first portion of the haul vehicle moves inside the outline of the traveling area, wherein when it is determined that a first portion of the haul vehicle can move above the structure, generating the traveling course so as to permit a first portion of the haul vehicle to move above the structure, when it is determined that the height of the structure is higher than a height of a second portion of the haul vehicle, generating the traveling course so as to require the first portion of the haul vehicle to move inside the outline of the traveling area; and providing, on the basis of the generating step, a signal to a traveling device to cause the haul vehicle to travel along the generated traveling course.

10. The haul vehicle management system according to claim 1, further comprising a sensor configured to emit and receive sensor signals to acquire the three-dimensional data outside the outline of the traveling area where the haul vehicle can travel, and wherein the sensor is operatively connected to the processor to provide the three-dimensional data to the processor.

11. The haul vehicle management system according to claim 10, wherein the sensor is operatively connected to an auxiliary vehicle traveling ahead of the haul vehicle.

12. The haul vehicle management system according to claim 11, wherein the haul vehicle is an autonomous vehicle and wherein the auxiliary vehicle is not an autonomous vehicle.

13. The haul vehicle management system according to claim 10, wherein the sensor is operatively connected to a front of the haul vehicle.

14. A haul vehicle management system comprising:

a processor and a memory, the memory including computer executable instructions configured to cause the processor to:

acquire data indicative of an outer shape of a haul vehicle;

acquire three-dimensional data outside an outline of a traveling area where the haul vehicle can travel, wherein the three-dimensional data includes a height of a structure present outside the outline;

generate a traveling course of the haul vehicle on a basis of the outer shape data of the haul vehicle and the three-dimensional data, the traveling course being set in the traveling area;

generate the traveling course, on a basis of the height of the structure, wherein when it is determined that a first portion of the haul vehicle can move above the structure, the traveling course is generated in such a manner as to permit a first portion of the haul vehicle to move above the structure and in such a manner that tires of the haul vehicle do not come into contact with the structure; and provide, on the basis of the generated traveling course, a signal to a traveling device to cause the haul vehicle to travel along the generated traveling course.

* * * * *